United States Patent
Zhang

(10) Patent No.: US 11,953,811 B2
(45) Date of Patent: Apr. 9, 2024

(54) ADJUSTMENT SUPPORT ASSEMBLY AND SURVEILLANCE CAMERA

(71) Applicant: Hangzhou Hikvision Digital Technology Co., Ltd., Zhejiang (CN)

(72) Inventor: Shouze Zhang, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 174 days.

(21) Appl. No.: 17/702,274

(22) Filed: Mar. 23, 2022

(65) Prior Publication Data

US 2022/0214604 A1 Jul. 7, 2022

Related U.S. Application Data

(63) Continuation of application No. PCT/CN2020/091459, filed on May 21, 2020.

(30) Foreign Application Priority Data

Oct. 11, 2019 (CN) .......................... 201910963900.9

(51) Int. Cl.
 *G03B 17/56* (2021.01)
 *F16M 11/14* (2006.01)
 *F16M 13/02* (2006.01)
 *H04N 7/18* (2006.01)

(52) U.S. Cl.
 CPC .......... *G03B 17/561* (2013.01); *F16M 11/14* (2013.01); *F16M 13/022* (2013.01); *H04N 7/18* (2013.01)

(58) Field of Classification Search
 None
 See application file for complete search history.

(56) References Cited

U.S. PATENT DOCUMENTS

| | | | | |
|---|---|---|---|---|
| 2010/0277821 | A1* | 11/2010 | Roth | B60R 1/04 |
| | | | | 359/872 |
| 2015/0354745 | A1 | 12/2015 | Tarnay | |
| 2020/0316792 | A1* | 10/2020 | Nighswander | B25J 17/0275 |
| 2021/0407262 | A1* | 12/2021 | Farneman | G08B 25/10 |

FOREIGN PATENT DOCUMENTS

| | | |
|---|---|---|
| CN | 201421535 Y | 3/2010 |
| CN | 102878172 A | 1/2013 |
| CN | 203147203 U | 8/2013 |
| CN | 104279411 A | 1/2015 |
| CN | 204358365 U | 5/2015 |
| CN | 204554269 U | 8/2015 |

(Continued)

*Primary Examiner* — Rodney E Fuller
(74) *Attorney, Agent, or Firm* — Bret E. Field; Bozicevic, Field & Francis LLP

(57) ABSTRACT

An adjustment support assembly and a surveillance camera are provided. The adjustment support assembly includes a first shell, a second shell, a first ball head, a second ball head, and a ball head connecting rod. The first ball head and the second ball head are fixed at two ends of the ball head connecting rod, respectively. The first shell is provided therein with a first ball head fixing portion, and the first ball head is rotatably arranged in the first ball head fixing portion. The second shell is provided therein with a second ball head fixing portion, and the second ball head is rotatably arranged in the second ball head fixing portion.

8 Claims, 2 Drawing Sheets

(56) References Cited

FOREIGN PATENT DOCUMENTS

| | | |
|---|---|---|
| CN | 206458976 U | 9/2017 |
| CN | 206907103 U | 1/2018 |
| CN | 207070142 U | 3/2018 |
| CN | 109268645 A | 1/2019 |
| CN | 208442534 U | 1/2019 |
| CN | 208886341 U | 5/2019 |

* cited by examiner

ADJUSTMENT SUPPORT ASSEMBLY AND SURVEILLANCE CAMERA

This is a continuation application of International Patent Application No. PCT/CN2020/091459, filed on May 21, 2020, which claims the priority to a Chinese patent application No. 201910963900.9, filed with the China National Intellectual Property Administration on Oct. 11, 2019, and entitled "ADJUSTMENT SUPPORT ASSEMBLY AND SURVEILLANCE CAMERA". The disclosures of these applications are incorporated herein by reference in their entirety.

TECHNICAL FIELD

The present disclosure relates to the technical field of security, in particular to an adjustment support assembly and a surveillance camera.

BACKGROUND

A surveillance camera is an important part in the field of security. A surveillance system may be configured with multiple surveillance cameras, so as to obtain surveillance images of multiple locations. The surveillance camera is generally fixed on a wall or other objects by means of an adjustment support assembly, and is rotatable within a certain range after being fixed, so as to obtain images within this range.

In the related art, the adjustment support assembly includes a base and a camera shell. The base and the camera shell are connected via a connecting rod with a ball head at one end. The ball head can be arranged in the camera shell. By controlling the rotation of the ball head, the camera shell rotates under the action of friction force of the ball head, so as to adjust an angle of the camera.

However, with solutions in the related art, a rotatable angle of the adjustment support assembly is limited, which cannot meet the needs of consumers.

SUMMARY

In order to overcome above defects in the related art, an objective of the present disclosure is to provide an adjustment support assembly and a surveillance camera. The present disclosure improves a range of a rotation angle of the adjustment support assembly.

An embodiment of the present disclosure provides an adjustment support assembly including a first shell, a second shell, a first ball head, a second ball head, and a ball head connecting rod. The first ball head and the second ball head are fixed at two ends of the ball head connecting rod, respectively. The first shell is provided therein with a first ball head fixing portion, and the first ball head is rotatably arranged in the first ball head fixing portion. The second shell is provided therein with a second ball head fixing portion, and the second ball head is rotatably arranged in the second ball head fixing portion.

In above adjustment support assembly, optionally, the first shell includes a first ball head tabletting and a first ball head wrapping member. The first ball head tabletting is provided thereon with a first mounting portion that is adapted to an outer surface of the first ball head. The first ball head wrapping member is provided thereon with a second mounting portion that is adapted to the outer surface of the first ball head. The first ball head tabletting is fixedly connected with the first ball head wrapping member, so that the first mounting portion and the second mounting portion enclose together to form the first ball head fixing portion.

In above adjustment support assembly, optionally, the second mounting portion is a first protrusion arranged on a surface of the first ball head wrapping member, and a surface of the second mounting portion is provided with a first notch.

In above adjustment support assembly, optionally, the first ball head wrapping member is provided therein with a plurality of first fixing holes, the first ball head tabletting is provided thereon with a plurality of first through holes. The plurality of the first through holes correspond to the plurality of the first fixing holes one by one. A first fastener passes through the first through hole and is fixed in the first fixing hole, so that the first ball head wrapping member is fixedly connected with the first ball head tabletting.

In above adjustment support assembly, optionally, the second shell includes a second ball head tabletting and a second ball head wrapping member. The second ball head tabletting is provided thereon with a third mounting portion that is adapted to an outer surface of the second ball head, and the second ball head wrapping member is provided thereon with a fourth mounting portion that is adapted to the outer surface of the second ball head. The second ball head tabletting is fixedly connected with the second ball head wrapping member, so that the third mounting portion and the fourth mounting portion enclose together to form the second ball head fixing portion.

In above adjustment support assembly, optionally, the fourth mounting portion is a second protrusion arranged on a surface of the second ball head wrapping member, and a surface of the fourth mounting portion is provided with a second notch.

In above adjustment support assembly, optionally, the second ball head wrapping member is provided therein with a plurality of second fixing holes, and the second ball head tabletting is provided thereon with a plurality of second through holes. The plurality of the second through holes correspond to the plurality of the second fixing holes one by one. A second fastener passes through the second through hole and is fixed in the second fixing hole, so that the second ball head wrapping member is fixedly connected with the second ball head tabletting.

In above adjustment support assembly, optionally, the first ball head is integrally connected with the ball head connecting rod, and the second ball head is detachably connected with the ball head connecting rod. Alternatively, both the first ball head and the second ball head are fixedly connected with the ball head connecting rod via fastening screws.

In above adjustment support assembly, optionally, the ball head connecting rod is provided at an end thereof a third fixing hole, and the second ball head is provided therein with a third through hole passing through the second ball head. A third fastener passes through the third through hole and is fixed in the third fixing hole, so that the second ball head is fixedly connected with the ball head connecting rod.

Another embodiment of the present disclosure provides a surveillance camera including any of the adjusting support assemblies above.

The present disclosure provides an adjustment support assembly and a surveillance camera. The adjustment support assembly includes a first shell, a second shell, a first ball head, a second ball head, and a ball head connecting rod. The first ball head and the second ball head are fixed at two ends of the ball head connecting rod, respectively. The first shell is provided therein a first ball head fixing portion, and the first ball head is rotatably arranged in the first ball head fixing portion. The second shell is provided therein with a second ball head fixing portion, and the second ball head is rotatably arranged in the second ball head fixing portion. Compared with the related art which adopts a solution with a single ball head, the present disclosure expands a range in which the first shell and the second shell are rotatable relative to each other, that is, expands the range of a rotation angle of the adjustment support assembly, by rotatably arranging the first ball head in the first shell and rotatably arranging the second ball head in the second shell.

BRIEF DESCRIPTION OF DRAWINGS

In order to describe the technical solutions of the embodiments of the present disclosure or related art more clearly, drawings to be used in the embodiments and in the related art will be briefly described below. It is apparent that the drawings provided below are only some embodiments of the present disclosure, and those skilled in the art can also obtain other drawings based on these drawings without any creative efforts.

In order to describe the technical solutions of the embodiments of the present disclosure or related art more clearly, drawings to be used in the embodiments and in the related art will be briefly described below. It is apparent that the drawings provided below are only some embodiments of the present disclosure, and those skilled in the art can also obtain other drawings based on these drawings without any creative efforts.

REFERENCE NUMERAL

100—a first shell;
110—a first ball head tabletting;
111—a first mounting portion;
112—a first through hole;
120—a first ball head wrapping member;
121—a second mounting portion;
1210—a first notch;
130—a first fastener;
200—a second shell;
210—a second ball head tabletting;
211—a third mounting portion;
220—a second ball head wrapping member;
221—a fourth mounting portion;
222—a second fixing hole;
230—a second fastener;
300—a first ball head;
400—a second ball head;
500—a ball head connecting rod;
510—a third fixing hole;
600—a third fastener.

DETAILED DESCRIPTION

In order to make the objectives, technical solutions, and advantages of the present disclosure clearer, the technical solutions of the embodiments of the present disclosure will be clearly and completely described below in combination with the drawings of the embodiments of the present disclosure. Obviously, the embodiments described are only some, and not all, of the embodiments of the present disclosure.

All other embodiments obtained based on the embodiments of the present disclosure by those skilled in the art without any creative efforts fall into the protection scope of the present disclosure. The following embodiments and features in the embodiments may be combined with each other in absence of conflict.

Embodiment 1

Figure 1:
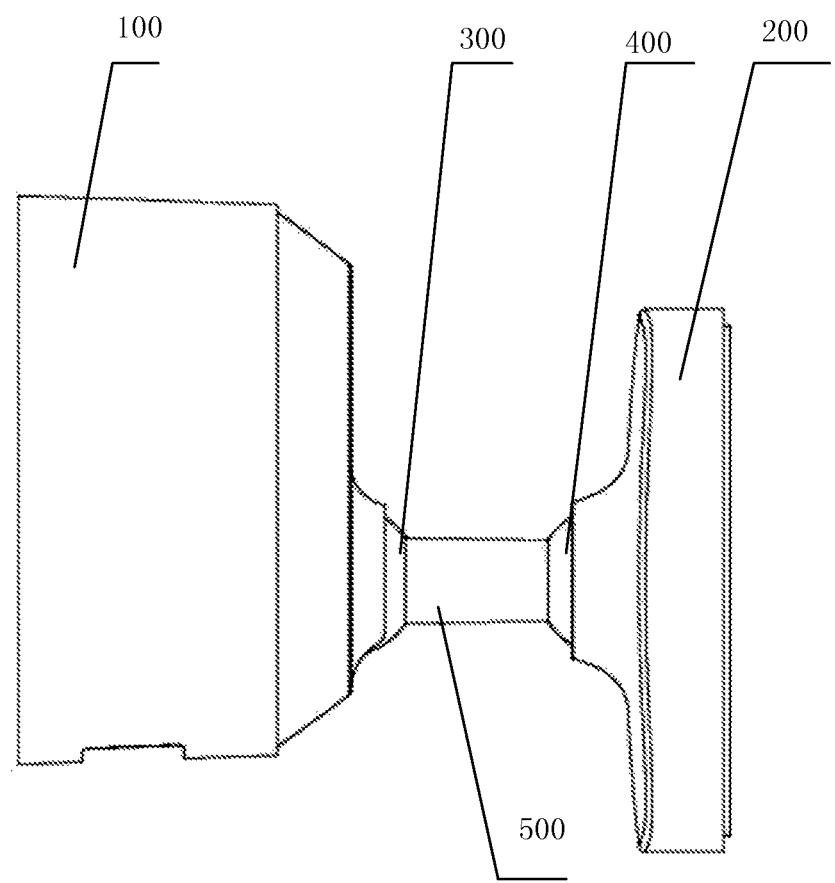
FIG. 1 is a schematic structural diagram of an adjustment support assembly provided by an embodiment of the present disclosure.
Figure 2:
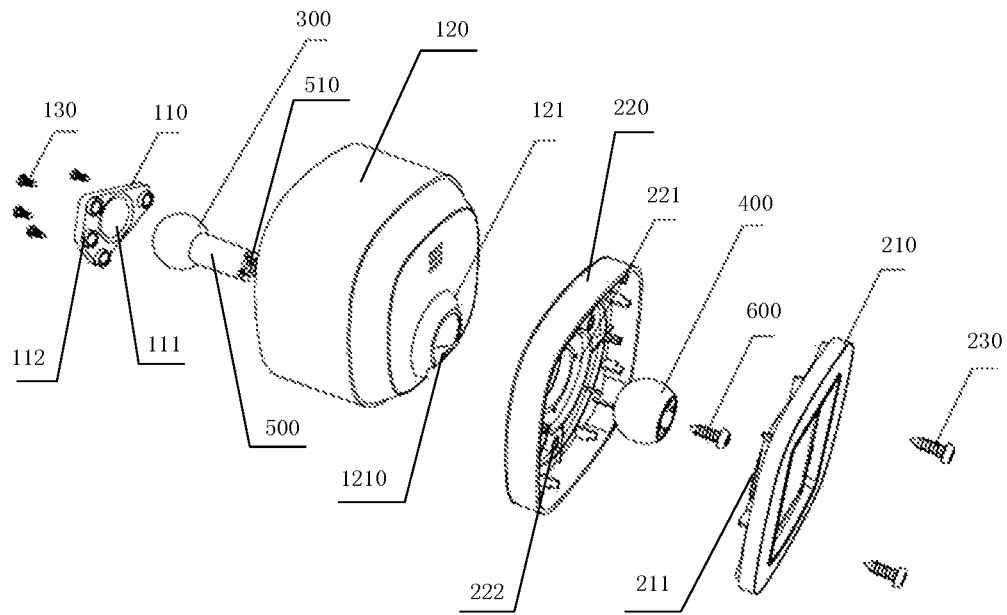
FIG. 2 is an exploded view of FIG. 1.
Figure 3:
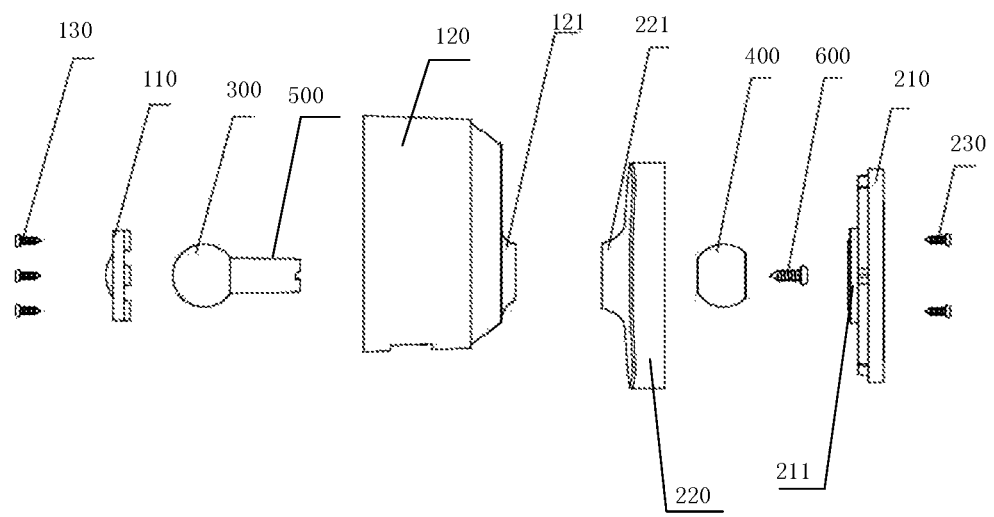
FIG. 3 is a front view of FIG. 2.

FIG. 1 is a schematic structural diagram of an adjustment support assembly provided by an embodiment of the present disclosure. FIG. 2 is an exploded view of FIG. 1. FIG. 3 is a front view of FIG. 2. Please refer to FIGS. 1-3.

The embodiment provides an adjustment support assembly including a first shell 100, a second shell 200, a first ball head 300, a second ball head 400, and a ball head connecting rod 500. The first ball head 300 and the second ball head 400 are fixed at two ends of the ball head connecting rod 500, respectively. A first ball head fixing portion is arranged in the first shell 100, and the first ball head 300 is rotatably arranged in the first ball head fixing portion. A second ball head fixing portion is arranged in the second shell 200, and the second ball head 400 is rotatably arranged in the second ball head fixing portion.

Specifically, the adjustment support assembly of the present embodiment can be applied to a surveillance camera to control a rotatable range of the surveillance camera. When applied to the surveillance camera, the first shell 100 may be a shell of the main body of the surveillance camera, and the second shell 200 may be a base of the surveillance camera. Of course, it is clear to those skilled in the art that the first shell 100 and the second shell 200 of the embodiment may also be applied to any other suitable fields. At this point, the first shell 100 and the second shell 200 may be separate components, and by connecting the first shell 100 and the second shell 200 with other devices, a relative rotation between the two devices can be achieved.

In the embodiment, a first ball head fixing portion is provided in the first shell 100, and the first ball head 300 is rotatably arranged in the first ball head fixing portion. A second ball head fixing portion is provided in the second shell 200, and the second ball head 400 is rotatably arranged in the second ball head fixing portion. Through above arrangement, when the first ball head 300 rotates, the first shell 100 may be driven to rotate by the action of friction force, and when the second ball head 400 rotates, the second shell 200 may also be driven to rotate by the action of friction force, so that the relative rotation of the first shell 100 and the second shell 200 is achieved.

In the embodiment, since the first ball head 300 and the second ball head 400 are respectively provided in the first shell 100 and the second shell 200, both the first shell 100 and the second shell 200 can rotate. Comparing with the solution with a single ball head in the related art, such embodiment significantly improve a range of a rotatable angle of the adjustment support assembly.

The adjustment support assembly provided by the embodiment includes a first shell 100, a second shell 200, a first ball head 300, a second ball head 400 and a ball head connecting rod 500. The first ball head 300 and the second ball head 400 are fixed at two ends of the ball head connecting rod 500, respectively. A first ball head fixing portion is provided in the first shell 100, and the first ball head 300 is rotatably arranged in the first ball head fixing portion. A second ball head fixing portion is provided in the second shell 200, and the second ball head 400 is rotatably arranged in the second ball head fixing portion. Compared with the related art which adopts the solution with a single ball head, the embodiment expands the range within which the first shell 100 and the second shell 200 are rotatable relative to each other, that is, improve the range of the rotatable angle of the adjustment support assembly, by rotatably arranging the first ball head 300 in the first shell 100 and the second ball head 400 in the second shell 200.

In an optional embodiment, the first shell 100 of the present disclosure includes a first ball head tabletting 110 and a first ball head wrapping member 120. The first ball head tabletting 110 is provided with a first mounting portion 111 that is adapted to an outer surface of the first ball head 300, and the first ball head wrapping member 120 is provided with a second mounting portion 121 that is adapted to the outer surface of the first ball head 300. The first ball head tabletting 110 is fixedly connected with the first ball head wrapping member 120, so that the first mounting portion 111 and the second mounting portion 121 enclose together to form the first ball head fixing portion. It is clear to those skilled in the art that both the first mounting portion 111 and the second mounting portion 121 may be adapted to a surface shape of a part of the first ball head 300, and the first ball head fixing portion formed through a combination of the first mounting portion and the second mounting portion may also accommodate only a part of the first ball head 300, as long as it can be ensured that the first ball head 300 is capable of rotating therein. Shapes of the first ball head tabletting 110 and the first ball head wrapping member 120 may be set as required, which are not further limited in the embodiment. Also, it can be understood that the first ball head tabletting 110 and the first ball head wrapping member 120 may be connected through nuts and screws, or may be bonded through adhesives.

Optionally, in order to expand a rotation range of the adjustment support assembly in a vertical direction, in the embodiment, the second mounting portion 121 may be a first protrusion arranged on the surface of the first ball head wrapping member 120, and a surface of the second mounting portion 121 is provided with a first notch 1210. The first notch 1210 may accommodate the ball head connecting rod 500. When the first ball head 300 rotates, the ball head connecting rod 500 may be driven to move along the first notch 1210, thereby driving the first shell 100 to move in the vertical direction, which expands a rotation range of the first shell 100 in the vertical direction.

Optionally, in the embodiment, a plurality of first fixing holes may be provided in the first ball head wrapping member 120, and a plurality of first through holes 112 are provided on the first ball head tabletting 110. The plurality of first through holes 112 correspond to the plurality of first fixing holes one by one. A first fastener 130 passes through the first through hole 112 and is fixed in the first fixing hole, so that the first ball head wrapping member 120 and the first ball head tabletting 110 are fixedly connected. The first fixing hole in the embodiment may be a threaded hole, and corresponding first fastener 130 may be a fastening screw.

In an optional embodiment, the second shell 200 includes a second ball head tabletting 210 and a second ball head wrapping member 220. The second ball head tabletting 210 is provided with a third mounting portion 211 that is adapted to an outer surface of the second ball head 400, and the second ball head wrapping member 220 is provided with a fourth mounting portion 221 that is adapted to the outer surface of the second ball head 400. The second ball head tabletting 210 and the second ball head wrapping member 220 are fixedly connected, so that the third mounting portion 211 and the fourth mounting portion 221 enclose together to form the second ball head fixing portion.

It is clear to those skilled in the art that both the third mounting portion 211 and the fourth mounting portion 221 may be adapted to a surface shape of a part of the second ball head 400, and the second ball head fixing portion formed through a combination of the third mounting portion and the fourth mounting portion may accommodate only a part of the second ball head 400, as long as it can be ensured that the second ball head 400 is capable of rotating therein. Shapes of the second ball head tabletting 210 and the second ball head wrapping member 220 may be set as required, which are not further limited in the embodiment.

Optionally, in order to expand a rotatable range of the adjustment support assembly, in the embodiment, the fourth mounting portion 221 may be a second protrusion arranged on the surface of the second ball head wrapping member 220, and a surface of the fourth mounting portion 221 is provided with a second notch. The second notch may accommodate the ball head connecting rod 500. When the second ball head 400 rotates, the ball head connecting rod 500 may be driven to move along the second notch, thereby expanding a rotatable range of the adjustment support assembly.

Optionally, in the embodiment, a plurality of second fixing holes 222 are provided in the second ball head wrapping member 220, and a plurality of second through holes are provided on the second ball head tabletting 210. The plurality of second through holes correspond to the plurality of second fixing holes 222 one by one. A second fastener 230 passes through the second through hole and is fixed in the second fixing hole 222, so that the second ball head wrapping member 220 and the second ball head tabletting 210 are fixedly connected. The second fixing hole 222 in the embodiment may be a threaded hole, and corresponding second fastener 230 may be a fastening screw.

Optionally, in order to facilitate an installation and a disassembly, in the embodiment, the first ball head 300 and the ball head connecting rod 500 may be connected and fixed by means of an integrated connection, and the second ball head 400 and the ball head connecting rod 500 may be fixed by means of a detachable connection. The first ball head 300 may be fixed in the first shell 100 during the installation, so that the ball head connecting rod 500 passes through the first ball head wrapping member 120. The second ball head 400 is then installed after the second ball head wrapping member 220 is sleeved on the ball head connecting rod 500. Finally, the second ball head tabletting 210 is fixed with the second ball head wrapping member 220, so as to complete an assembly connection.

Specifically, an end of the ball head connecting rod 500 may be provided with a third fixing hole 510, and the second ball head 400 may be provided therein with a third through hole passing through the second ball 400. A third fastener 600 passes through the third through hole and is fixed in the third fixing hole 510 to fixedly connect the second ball head 400 and the ball head connecting rod 500. The end of the ball head connecting rod 500 refers to the end of the ball head connecting rod 500 used for connecting with the second ball head 400.

In other optional embodiments, both the first ball head 300 and the second ball head 400 may be fixedly connected to the ball head connecting rod 500 through fastening screws.

Embodiment 2

The embodiment provides a surveillance camera including the adjustment support assembly described in above Embodiment 1, in which the first shell of the adjustment support assembly may be the shell of the main body of the surveillance camera (that is, the shell for mounting main components such as the camera), and the second shell may be the shell of the base of the surveillance camera. By connecting the shell of the main body of the surveillance camera with the base of the surveillance camera through the first ball head and the second ball head, thus a relative rotation therebetween is achieved.

Compared with the related art which adopts the solution with a single ball head, since the surveillance camera provided in the embodiment adopts the adjustment support assembly described in above Embodiment 1, the present disclosure expands the rotatable range of the surveillance camera and a monitoring area.

In the description of the present disclosure, it should be understood that orientational or positional relationships indicated by terms "center", "longitudinal", "lateral", "length", "width", "thickness", "above", "below", "front", "back", "left", "right", "vertical", "horizontal", "top", "bottom", "inner", "outer", "clockwise", "counterclockwise", "axial", "radial", "circumferential" and the like are based on the orientational or positional relationships shown in the drawings, and are only for the convenience of describing the present disclosure and simplifying the description, rather than indicating or implying that the devices or elements indicated must have a particular orientation, be constructed and operated in the particular orientation, thus not being construed as limitations on the present disclosure.

In the present disclosure, unless otherwise expressly specified and limited, the terms "install", "connect", "connecting", "fix" and the like should be understood in a broad sense, for example, it may be a fixed connection or a detachable connection, or integrated; it may be directly connected or indirectly connected through an intermediate medium, and it may be an internal connection of two elements or an interaction relationship between the two elements. For those of ordinary skill in the art, specific meanings of above terms in the present disclosure may be understood according to specific situations.

It should be noted that, in the description of the present disclosure, the terms "first" and "second" are only used to facilitate descriptions of different components, and should not be understood as indicating or implying a sequence relationship, relative importance, or implicitly indicating the number of technical features indicated. Thus, a feature defined by "first", "second" may expressly or implicitly include at least one such feature.

Finally, it should be noted that, the embodiments described above are only used to illustrate the technical solutions of the present disclosure, and are not used to limit them. Although the present disclosure has been described in detail with reference to the foregoing embodiments, those skilled in the art should understand that they can still modify the technical solutions recorded in above embodiments or make equivalent replacements for some or all of the technical features. These modifications or substitutions do not make the essence of corresponding technical solutions depart from the scope of the technical solutions of the embodiments of the present disclosure.

What is claimed is:

1. A support assembly, comprising a first shell, a second shell, a first ball head, a second ball head, and a ball head connecting rod; wherein
the first ball head and the second ball head are fixed at two ends of the ball head connecting rod, respectively; the first shell is provided therein with a first ball head fixing portion, and the first ball head is rotatably arranged in the first ball head fixing portion; the second shell is provided therein with a second ball head fixing portion, and the second ball head is rotatably arranged in the second ball head fixing portion; wherein
the first shell is driven to rotate by the action of friction force when the first ball head rotates, so that a relative rotation of the first shell and the second shell is achieved; and wherein
the second ball head is detachably connected with the ball head connecting rod; the ball head connecting rod is provided at an end thereof a third fixing hole, the second ball head is provided therein with a third through hole passing through the second ball head, and a third fastener passes through the third through hole and is fixed in the third fixing hole, so that the second ball head is fixedly connected with the ball head connecting rod.

2. The support assembly of claim 1, wherein the first shell comprises a first ball head tabletting and a first ball head wrapping member;
the first ball head tabletting is provided thereon with a first mounting portion that is adapted to an outer surface of the first ball head, the first ball head wrapping member is provided thereon with a second mounting portion that is adapted to the outer surface of the first ball head; and the first ball head tabletting is fixedly connected with the first ball head wrapping member, so that the first mounting portion and the second mounting portion enclose together to form the first ball head fixing portion.

3. The support assembly of claim 2, wherein the second mounting portion is a first protrusion arranged on a surface of the first ball head wrapping member, and a surface of the second mounting portion is provided with a first notch.

4. The support assembly of claim 2, wherein the first ball head wrapping member is provided therein with a plurality of first fixing holes, the first ball head tabletting is provided thereon with a plurality of first through holes, and the plurality of the first through holes correspond to the plurality of the first fixing holes one by one; and
a first fastener passes through the first through hole and is fixed in the first fixing hole, so that the first ball head wrapping member is fixedly connected with the first ball head tabletting.

5. The support assembly of claim 1, wherein the second shell comprises a second ball head tabletting and a second ball head wrapping member;
the second ball head tabletting is provided thereon with a third mounting portion that is adapted to an outer surface of the second ball head, the second ball head wrapping member is provided thereon with a fourth mounting portion that is adapted to the outer surface of the second ball head; and the second ball head tabletting is fixedly connected with the second ball head wrapping member, so that the third mounting portion and the fourth mounting portion enclose together to form the second ball head fixing portion.

6. The support assembly of claim 5, wherein the fourth mounting portion is a second protrusion arranged on a surface of the second ball head wrapping member, and a surface of the fourth mounting portion is provided with a second notch.

7. The support assembly of claim 5, wherein the second ball head wrapping member is provided therein with a plurality of second fixing holes, the second ball head tabletting is provided thereon with a plurality of second through holes, and the plurality of the second through holes correspond to the plurality of the second fixing holes one by one; and a second fastener passes through the second through hole and is fixed in the second fixing hole, so that the second ball head wrapping member is fixedly connected with the second ball head tabletting.

8. A surveillance camera comprising:

a first shell, a second shell, a first ball head, a second ball head, and a ball head connecting rod; wherein the first ball head and the second ball head are fixed at two ends of the ball head connecting rod, respectively; the first shell is provided therein with a first ball head fixing portion, and the first ball head is rotatably arranged in the first ball head fixing portion; the second shell is provided therein with a second ball head fixing portion, and the second ball head is rotatably arranged in the second ball head fixing portion; and wherein the second ball head is provided with a through hole, and the ball head connecting rod is provided at an end corresponding to the second ball head a fixing hole; and a fastener;

wherein the surveillance camera is defined in such a way that the fastener passes through the second ball head and the second shell in sequence, and is fastened with the fixing hole of the ball head connecting rod.

* * * * *